US008254318B2

(12) United States Patent
Monogioudis et al.

(10) Patent No.: US 8,254,318 B2
(45) Date of Patent: Aug. 28, 2012

(54) WIRELESS COMMUNICATION SYSTEM AND METHOD OF JOINT BEAMFORMING WIRELESS COMMUNICATION

(75) Inventors: Pantelis Monogioudis, Randolph, NJ (US); Sivarama Venkatesan, Milltown, NJ (US)

(73) Assignee: Alcatel Lucent, Paris (FR)

( * ) Notice: Subject to any disclaimer, the term of this patent is extended or adjusted under 35 U.S.C. 154(b) by 951 days.

(21) Appl. No.: 12/216,825

(22) Filed: Jul. 11, 2008

(65) Prior Publication Data

US 2010/0009717 A1 Jan. 14, 2010

(51) Int. Cl.
*H04W 4/00* (2009.01)
*H04W 72/00* (2009.01)
*H04J 3/26* (2006.01)

(52) U.S. Cl. ......... 370/329; 370/432; 370/468; 455/450

(58) Field of Classification Search .......... 370/328–330, 370/389, 392, 400, 401, 431–433, 464, 465, 370/468; 455/450–453
See application file for complete search history.

(56) References Cited

U.S. PATENT DOCUMENTS

2008/0187062 A1* 8/2008 Pan et al. .................... 375/260
2008/0260059 A1* 10/2008 Pan .............................. 375/260
2009/0069054 A1* 3/2009 Zangi et al. ............... 455/562.1

* cited by examiner

*Primary Examiner* — Kerri Rose
(74) *Attorney, Agent, or Firm* — Harness, Dickey & Pierce, P.L.C.

(57) ABSTRACT

A wireless communication system and joint beamforming method across multiple base stations for communicating with mobile stations. The wireless communication system communication system includes base stations and mobile stations. At least one of the base stations includes a joint beamformer controlling beamforming for the base stations. Each of the mobile stations receive information from the base stations, maintain a multiple-input and multiple-output active set (MAS) of base stations, and provide precoder weights to each of the base stations included in the MAS. The joint beamformer calculates joint beamforming weights for controlling communications between the base stations and mobile stations.

21 Claims, 2 Drawing Sheets

Controlling Multi-BS MIMO BS

Multi-BS MIMO BS

W(2)

Joint Beamforming Weight

Precoder Weight

220

210

225

Antenna Pilots

Precoder Weight

100

WIRELESS COMMUNICATION SYSTEM AND METHOD OF JOINT BEAMFORMING WIRELESS COMMUNICATION

BACKGROUND

1. Field of the Invention

The present application relates to a system and method for telecommunications. More particularly, the application is directed to a system and joint beamforming method across multiple base stations communicating with mobile stations.

2. Background Information

Many wireless communications systems are available to communicate information between users. One such wireless communication system is referred herein as a multiple-input and multiple-output (MIMO) system. A conventional MIMO network includes a plurality of base stations providing communications to a plurality of mobile stations. The network is referred to as a MIMO network in light of the use of multiple antennas at both the transmitter and receiver. The use of multiple antennas at both a base station and mobile station may improve communication performance.

Conventionally, a base station of a MIMO network providing communication services to a mobile station may use beamforming to provide communication services to the mobile station. Beamforming is a well-known signal processing technique for directional signal transmission or reception.

Beamforming performed by a conventional base station is based on information received only from a mobile station being served by the base station. This information may then be used by a beamformer of the base station to control the characteristics of a signal best used for communicating with the mobile station. As such, a conventional base station of a MIMO network does not receive information from mobile stations being served by other base stations of the MIMO network.

SUMMARY

An example embodiment of the present application provides a method for wireless communications. The method includes receiving precoder weights associated with at least two mobile stations, calculating a matrix based on the received precoder weights, and controlling beamforming for antennas of multiple base stations used to communicate to the at least two mobile stations based on the calculated matrix. Each entry of the calculated matrix may be a complex Gaussian representing the channel between a qth base station transmit antenna and a pth mobile station receive antenna, where q represents one of a plurality of base station transmit antennas transmitting to the mobile station and p represents one of a plurality of receive antennas of the mobile station.

The method may receive at least one of the precoder weights directly from at least one of the mobile stations. The method may also receive at least one of the precoder weights from a base station. Multiple precoder weights may be received simultaneously via a signal having the multiple precoder weights superimposed with each other or orthogonally arranged with each other. The received precoder weights may be associated with different antenna configurations of a base station.

Also, the method may include performing a mapping function on the calculated matrix to obtain a joint beamforming weight for each of the multiple base stations. The method may also include transmitting the joint beamforming weight to a corresponding base station. The transmitted beamforming weight may be used by the corresponding base station to control communications between the corresponding base station and at least one of the mobile stations.

Another example embodiment also provides a wireless communication method. The wireless communication method includes receiving at least one precoder weight from a mobile station, transmitting the received at least one precoder weight to a joint beamformer for multiple base stations, receiving at least a portion of a joint beamforming weight, and communicating with the mobile station based on the received joint beamforming weight. The precoder weight representing a communication channel with a mobile station.

Still another example embodiment provides a method for wireless communications. The method includes maintaining a multiple-input and multiple-output active set (MAS) of base stations, calculating multiple precoder weights based on information received from base stations included in the MAS, and sending the calculated precoder weights to the base stations included in the MAS. Multiple precoder weights may be calculated for different antenna configurations of the base stations.

Another example embodiment provides a wireless communication system. The wireless communication system includes a plurality of base stations and a plurality of mobile stations. At least one of the base stations includes a joint beamformer controlling beamforming for the base stations. Each of the mobile stations receive information from the base stations, maintain a multiple-input and multiple-output active set (MAS) of base stations, and provide precoder weights to each of the base stations included in the MAS. The joint beamformer calculates joint beamforming weights for controlling communications between the base stations and mobile stations.

BRIEF DESCRIPTION OF THE DRAWINGS

The above and other features and advantages of example embodiments will become more apparent by reviewing the following detailed description of this disclosure with reference to the attached drawings in which.

DETAILED DESCRIPTION OF EXAMPLE EMBODIMENTS

In the following description, for purposes of explanation and not limitation, specific details are set forth such as particular architectures, interfaces, techniques, etc., in order to provide a thorough understanding of example embodiments. However, it will be apparent to those skilled in the art that example embodiments may be practiced in other illustrative embodiments that depart from these specific details. In some instances, detailed descriptions of well-known devices, circuits, and methods are omitted so as not to obscure the description of example embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, example embodiments will be described in the general context of computer-executable instructions, such as program modules or functional processes, being executed by one or more processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware of existing base stations and mobile stations. For example, the base stations and mobile stations may each include a processor, memory and transceiver used in combination to perform the various operations, functions and communications described below.

In the following description, example embodiments will be described with reference to acts and symbolic representations of operations that are performed by one or more processors, unless indicated otherwise. As such, it will be understood that such acts and operations include the manipulation by the processor of electrical signals representing data in a structured form. This manipulation transforms the data or maintains it at locations in the memory system of the computer, mobile station, base station, etc., which reconfigures or otherwise alters the operation of the computer, mobile station, base station, etc., in a manner well understood by those skilled in the art.

Figure 1:
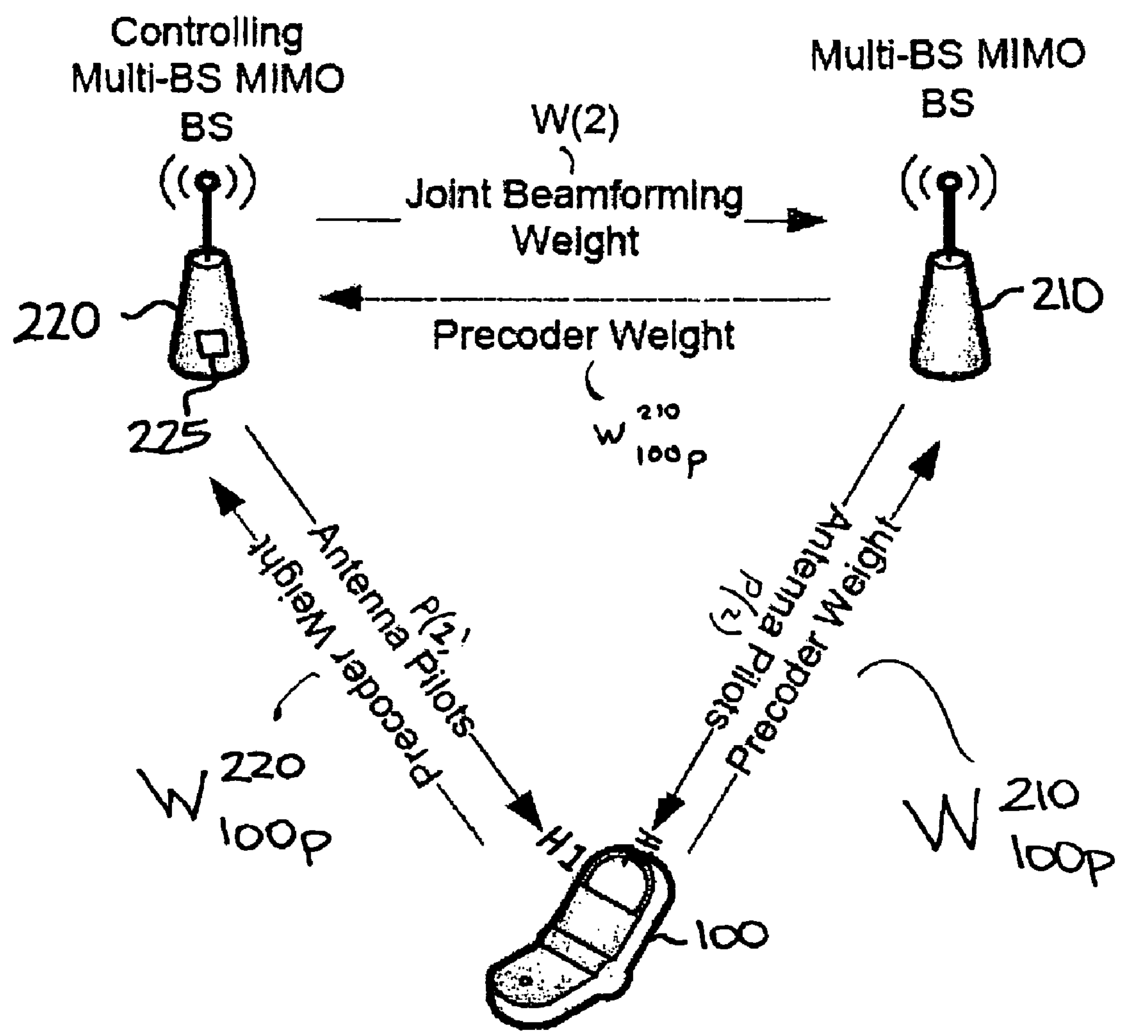
FIG. 1 illustrates a portion of an example embodiment of a MIMO wireless communication system and communications between various components of the communication system.

FIG. 1 illustrates a portion of a multiple-input and multiple-output (MIMO) system for wireless communications. Referring to FIG. 1, the MIMO system includes a mobile station 100, a base station 210, and a controlling base station 220. The controlling base station 220 may include a joint beamformer 225. While only two base stations 210 and 220 and one mobile station 100 is shown in FIG. 1, one skilled in the art will appreciate that the MIMO system includes more than two base stations and more than one mobile station.

The mobile station 100 provides precoder weights to a plurality of base stations. A Nominal Precoder Matrix that is known by a mobile station 100 allows the mobile station 100 to calculate the precoder weights communicated to the base station 210 and 220. The Nominal Precoder Matrix may be a unitary matrix or any other matrix that is a-priori known to both the mobile station 100 and base stations 210 and 210. In many instances, the Nominal Precoder Matrix is downloadable to the mobile station upon network entry.

The generation and transmission of precoder weights used to represent a channel between a base station and mobile station is well known in the art and thus, will only briefly be discussed herein for the sake of brevity. However, it is noted that the conventionally a mobile station only communicates precoder weights to a base station currently serving the mobile station.

The mobile station 100 shown in FIG. 1 calculates and communicates precoder weights to a plurality base stations, i.e., base station 210 and controlling base station 220. The mobile station 100 includes a memory storing information. For example, the memory of the mobile station stores MIMO active set (MAS) of base stations. The MAS of base stations is a list of base stations that may be used to simultaneously communicate with the mobile station 100. The MAS is maintained and/or modified by the mobile station 100 in response to communications received from one or more base stations. As the environment of the mobile station 100 varies, one or more base stations included in the MAS may be removed or added to the list.

In FIG. 1, the mobile station 100 is shown as receiving pilot signals from antennas of both the controlling base station 220 and the base station 210. Each of the base station 210 and the controlling base station 220 may be included in the MAS of the mobile station 100. However, it is noted that if the environment of the mobile station 100 changes in light of a change of location, for example, the base station 210 may no longer be able to communicate with the mobile station 100 and thus, the mobile station may remove the base station 210 from the MAS and replace the base station 210 with another base station suitable for communicating with the mobile station 100. However, in the remainder of this disclosure relating to the example shown in FIG. 1, it is assumed the mobile station 100 is capable of receiving antenna pilot signals from both the controlling base station 220 and the base station 210.

The mobile station 100 may provide a precoder weight back to a base station in response to receiving a pilot signal from the base station. Herein, a precoder weight is represented using the following notation $w_{np}^{m}$ wherein m identifies one of the plurality of base stations included in the MIMO network, n identifies the mobile station calculating the precoder weight, and p identifies one of the multiple antennas of the mobile station 100 associated with the precoder weight. Referring to FIG. 1, a first precoder weight $w_{100\,p}^{220}$ is calculated by the mobile station 100 in response to receiving a first set of per antenna pilot signals P(1) transmitted by the controlling base station 220, and a second precoder weight $w_{100\,p}^{210}$ is calculated by the mobile station 100 in response to receiving a second set of per antenna pilot signals P(2) transmitted by the base station 210. H1 and H2 are sets of received signals at the receive antennas of the mobile station 100 and respectively correspond to the sets of per antenna pilot signals P(1) and P(2). The first precoder weight of the mobile station $w_{100\,p}^{220}$ may be different than the second precoder weight $w_{100\,p}^{210}$ since the precoder weights correspond to the two independent channels from the two base stations.

As previously mentioned, the controlling base station 220 may include the joint beamformer 225. The joint beamformer 225 controls beamforming across multiple base stations according to an example embodiment. Stated differently, the joint beamformer 225 receives information associated with a plurality of mobile stations receiving communications from a plurality of base stations included in a MIMO network. The information associated with the plurality of mobile stations is used to control communications of the plurality of base stations with the plurality of mobile stations. Accordingly, the joint beamformer 225 differs from conventional beamformers in that the beamformer 225 provides information for more than one base station of the MIMO network.

The joint beamformer 225 provides multi-user joint beamforming across multiple base stations. The joint beamformer 225 provides the joint beamforming by calculating a mapping function $f$, which be discussed further later in this disclosure.

For illustration purposes, various assumptions are used in following description of the joint channel matrix. In particular, the example described below involves a number of mobile stations 100 and each of these mobile stations has a number of receive antennas. Herein, N is used to represent the number of mobile stations 100 and r is used to represent the number of receive antennas for each of the mobile stations 100. Further, t represents the number of transmit antennas of a base station, and M represents the number of base stations. Considering the above notations, the joint channel matrix may be a N×M matrix. A channel entry within the channel matrix of an $n^{th}$ mobile station 100 is represented by (r×Mt). Each entry of the channel matrix is a complex Gaussian representing the channel between the $q^{th}$ base station transmit antenna and the $p^{th}$ mobile station receive antenna, where q represents one of the base station transmit antennas and p represents one of the mobile station receive antennas. Further, the received signal at the receive antenna of the mobile station 100 is represented by the following equation: $y_n = H_n X + v_n$, where y is the received r-dim vector, X is the vector that represents the superposition of N mobile station signals, and $v_n$ represents noise.

In one embodiment, the elements of the joint channel matrix are the feedback precoder weights. Once the channel matrix is calculated as described above, the joint beamformer 225 performs a mapping function $f$ that maps the received precoder vectors into a joint beamforming weight W for a base station. The beamforming weights may be used by base stations of the MIMO system to control communications with the mobiles stations. As shown in FIG. 1, the controlling base station 220 communicates portion of the joint beamforming weight W(2) to base station 210. The base station 210 then uses the beamforming weight W(2) to control communications sent to the mobile station 100. It is noted that the exact mapping function $f$ used for generating the beamforming weights from the joint channel matrix is outside the scope of this disclosure. However, for completeness it is noted that two example criteria that may be used to implement function $f$, which may be used to generate the beamforming weights is a Zero-Forcing (ZF) or Minimum Mean Squared Error (MMSE) criteria, which is well-known in the art.

According to another embodiment, the joint beamformer does not form the joint channel matrix first but instead, directly performs the mapping function $f$ on the precoder weights.

Using the beamforming weights to control communications between and base station and mobile station may allow transmission with an $n^{th}$ mobile station that will reduce and/or minimize interference towards the directions of the other mobile stations. Accordingly, the received signal plus interference-to-noise ratio SINR at locations with the MIMO network are improved.

The granularity of an example embodiment of precoder matrix such as that described above is largely outside the scope of this disclosure, however, it is noted that the higher the granularity, the better the joint beamformer 225 can null interference.

Still referring to FIG. 1, the base station 210 is not a controlling base station. Stated differently, the base station 210 does not include a joint beamformer. Since the base station 210 does not include a joint beamformer, precoder weights $w_{np}^{m}$ received by the base station 210 are forwarded to the controlling base station 220 for processing by the joint beamformer 225.

It noted that both the base station 210 and the controlling base station 220 may also store and maintain a MAS associated with a mobile station. For example, the base station 210 may use the MAS to determine when all precoder weights $w_{np}^{m}$ from the mobile station 100 have been received. As such, the base station 210 may transmit the precoder weights $w_{np}^{m}$ to the controlling base station 220 once all of the precoder weights are received. Further, the MAS maintained by the controlling base station 220 may be used to control when and/or how often the joint channel matrix is generated and calculated beamforming weights W are transmitted to the base stations.

Figure 2:
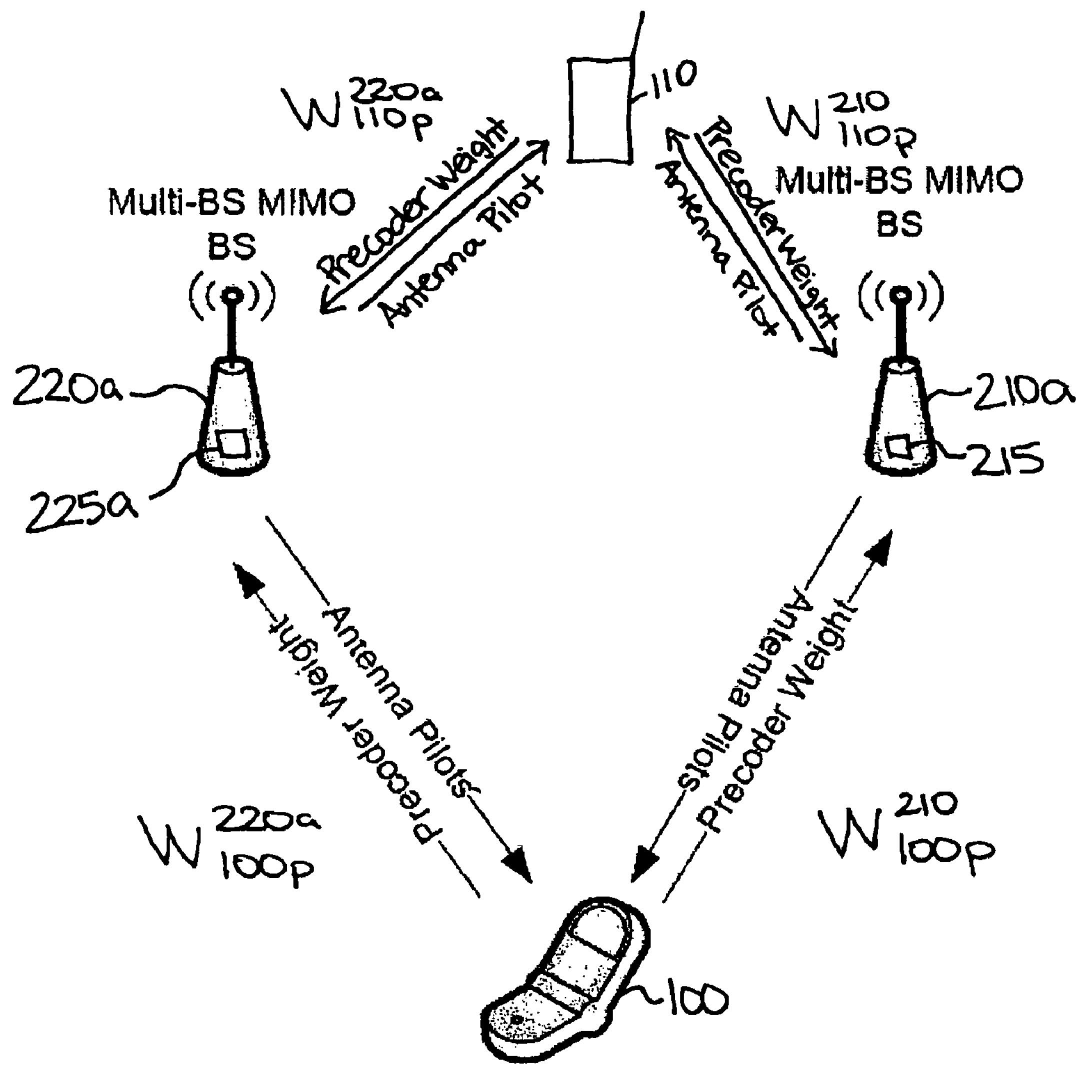
FIG. 2 illustrates a portion of another example embodiment of a MIMO wireless communication system and communications between various components of the communication system.

FIG. 2 illustrates a portion of another example embodiment of a (MIMO) system for wireless communications. The portion of the MIMO system shown in FIG. 2 includes a first base station 220*a* including a first joint beamformer 225*a*, a second base station 210*a* including a second joint beamformer 215, a first mobile station 100 and a second mobile station 110. Most of the components and communications shown in FIG. 2 are the same as, or substantially similar to, corresponding components and/or communications illustrated in FIG. 1 and thus, a detailed description of these components and/or communications are omitted herein for the sake of brevity.

However, as shown in FIG. 2, each of the first base station 220*a* and the second base station 210*a* include joint beamformers. It is noted that each for the first beamformer 225*a* and the second beamformer 215 generate a joint channel matrix as previously described with respect to FIG. 1. Similarly, each of the first beamformer 225*a* and the second beamformer 215 are capable of generating their own beamforming weights, and thus communications between the first base station 220*a* and the second base station 210*a* are reduced as compared with the example embodiment described above with respect to FIG. 1. It is noted that each of the first beamformer 225*a* and the second beamformer 215 are still different from conventional base stations including beamformers in that each of the first beamformer 225*a* and the second beamformer 215 receive precoder weights from a plurality of mobile stations 100 and 110 and perform beamforming across multiple base stations 210*a* and 220*a*.

Further, the mobile stations 100 and 110 may send precoder weights $w_{np}^{m}$ simultaneously. For example, the mobile stations 100 and 110 may superimpose multiple precoder weights $w_{np}^{m}$ in a common waveform and/or orthogonally arrange the precoder weights $w_{np}^{m}$ in a waveform. Stated differently, examples of techniques that could be used for simultaneously transmitting multiple precoder weights include CDMA, OFDMA, superposed OFDMA, etc.

Still further, the above-described example embodiments may be particularly beneficial when there is mobility and heterogeneity in the radio access network RAN and allow mobile stations 100 and 110 to seamlessly switch between a multi-base station reception mode and single base station MIMO reception mode. For example, a MAS stored in the mobile stations 100 and 110 may be heterogeneous with respect to the antenna configurations of the individual base stations 210*a* and 220*a*. The mobile stations 100 and 110 may transmit the precoder weights $w_{np}^{m}$ that are suitable for each antenna configuration. For example, the mobile stations 100 and 110 can transmit a beamforming weight for a 4×2 antenna configuration that corresponds to the strongest base station sector in the MAS of the mobile stations 100 and 110 while simultaneously transmitting a 2×2 configuration that corresponds to a second strongest base station sector in the MAS of the mobile stations 100 and 110.

Example embodiments being thus described, it will be obvious that the same may be varied in many ways. Such variations are not to be regarded as a departure from the example embodiments, and all such modifications are intended to be included within the scope.

We claim:

1. A method for wireless communications comprising:

receiving precoder weights associated with at least two mobile stations;

calculating a matrix based on the received precoder weights; and controlling beamforming for antennas of multiple base stations used to communicate to the at least two mobile stations based on the calculated matrix.

2. The method of claim 1, wherein each entry of the calculated matrix is a complex Gaussian representing the channel between a $q^{th}$ base station transmit antenna and a $p^{th}$ mobile station receive antenna, q representing one of a plurality of base station transmit antennas transmitting to the mobile station and p representing one of a plurality of receive antennas of the mobile station.

3. The method of claim 1, wherein receiving the precoder weights receives at least one of the precoder weights directly from at least one of the mobile stations.

4. The method of claim 1, wherein receiving the precoder weights receives at least one of the precoder weights from a base station.

5. The method of claim 1, further comprising:

performing a mapping function on the calculated matrix to obtain a joint beamforming weight for each of the multiple base stations.

6. The method of claim 5, further comprising:

transmitting the joint beamforming weight to a corresponding base station, the transmitted beamforming weight being used by the corresponding base stations to control communications between the corresponding base station and at least one of the mobile stations.

7. The method of claim 1, wherein receiving precoder weights receives multiple precoder weights simultaneously.

8. The method of claim 1, wherein receiving precoder weights receives a signal including multiple precoder weights being one of superimposed with each other and orthogonally arranged with each other.

9. The method of claim 1, wherein receiving precoder weights receives at least two of the precoder weights that are associated with different antenna configurations of a base station.

10. A method of claim 1, wherein at least one of the at last least two mobile stations is not served by a base station controlling the beamforming.

11. A method for wireless communications comprising:

receiving at least one precoder weight from a mobile station, the precoder weight representing a communication channel with a mobile station;

transmitting the received at least one precoder weight to a joint beamformer for multiple base stations;

receiving at least a portion of a joint beamforming weight; and communicating with the mobile station based on the received joint beamforming weight.

12. The method of claim 11, wherein receiving at least one precoder weight receives multiple precoder weights from different mobile stations.

13. The method of claim 11, wherein receiving at least one precoder weight receives multiple precoder weights simultaneously.

14. The method of claim 11, wherein receiving at least one precoder weight receives a signal including multiple precoder weights being one of superimposed with each other and orthogonally arranged with each other.

15. The method of claim 11, wherein receiving at least one precoder weight receives at least two of the precoder weights that are associated with different antenna configurations of a base station.

16. A method for wireless communications comprising:

maintaining a multiple-input and multiple-output active set (MAS) of base stations;

calculating multiple precoder weights based on information received from base stations included in the MAS; and sending the calculated precoder weights to the base stations included in the MAS.

17. The method of claim 16, wherein calculating multiple precoder weights calculates different precoder weights associated that are associated with different antenna configurations of the base stations.

18. The method of claim 16, wherein sending the calculated precoder weights sends multiple the multiple precoder weights simultaneously.

19. The method of claim 16, wherein sending the calculated precoder weights are sent in a signal including the precoder weights being one of superimposed with each other and orthogonally arranged with each other.

20. A wireless communication system comprising:

a plurality of base stations, at least one of the base stations including a joint beamformer controlling beamforming for the base stations; and a plurality of mobile stations, each of the mobile stations receiving information from the base stations, a multiple-input and multiple-output active set (MAS) of base stations; and providing precoder weights to each of the base stations included in the MAS.

21. The wireless communication system of claim 20, wherein the joint beamformer calculates joint beamforming weights for controlling communications between the base stations and mobile stations.

* * * * *